(12) United States Patent
He et al.

(10) Patent No.: US 12,300,825 B2
(45) Date of Patent: May 13, 2025

(54) BATTERY, BATTERY MODULE, BATTERY PACK, AND ELECTRIC VEHICLE

(71) Applicant: BYD COMPANY LIMITED, Guangdong (CN)

(72) Inventors: Long He, Shenzhen (CN); Huajun Sun, Shenzhen (CN); Shichao Hu, Shenzhen (CN); Wansong Yuan, Shenzhen (CN); Yan Zhu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 489 days.

(21) Appl. No.: 17/792,318

(22) PCT Filed: Jan. 4, 2021

(86) PCT No.: PCT/CN2021/070150
§ 371 (c)(1),
(2) Date: Jul. 12, 2022

(87) PCT Pub. No.: WO2021/143560
PCT Pub. Date: Jul. 22, 2021

(65) Prior Publication Data
US 2023/0059574 A1    Feb. 23, 2023

(30) Foreign Application Priority Data
Jan. 13, 2020    (CN) .................. 202010033794.7

(51) Int. Cl.
*H01M 50/119*    (2021.01)
*H01M 10/04*    (2006.01)
(Continued)

(52) U.S. Cl.
CPC ..... *H01M 50/119* (2021.01); *H01M 10/0413* (2013.01); *H01M 50/103* (2021.01);
(Continued)

(58) Field of Classification Search
CPC .......... H01M 50/119; H01M 10/0413; H01M 50/103; H01M 50/186; H01M 50/317;
(Continued)

(56) References Cited

U.S. PATENT DOCUMENTS 3,078,329 A    2/1963    Granger
2011/0305948 A1*    12/2011    Miyatake ............. H01M 4/668
252/511

(Continued)

FOREIGN PATENT DOCUMENTS

CN    108780856 A    11/2018
CN    110268550 A    9/2019
(Continued)

OTHER PUBLICATIONS

English Translation of International Search Report from PCT/CN2021/070150 dated Mar. 29, 2021 (3 pages).

*Primary Examiner* — Milton I Cano
*Assistant Examiner* — Albert Michael Hilton
(74) *Attorney, Agent, or Firm* — Calfee, Halter & Griswold LLP (57) ABSTRACT

A battery, a battery module, a battery pack, and an electric vehicle are provided. The battery includes a metal shell and a plurality of electrode core assemblies sealed in the metal shell and arranged in sequence. The electrode core assemblies are connected in series. Each of the electrode core assemblies includes at least one electrode core. The electrode core assemblies are sealed in a packaging film. An air pressure between the metal shell and the packaging film is lower than an air pressure outside the metal shell. An air pressure inside the packaging film is lower than the air pressure between the metal shell and the packaging film.

30 Claims, 7 Drawing Sheets

(51) Int. Cl.
    *H01M 50/103*    (2021.01)
    *H01M 50/186*    (2021.01)
    *H01M 50/317*    (2021.01)
    *H01M 50/451*    (2021.01)
    *H01M 50/51*    (2021.01)
    *H01M 50/529*    (2021.01)

(52) U.S. Cl.
CPC ....... *H01M 50/186* (2021.01); *H01M 50/317* (2021.01); *H01M 50/451* (2021.01); *H01M 50/51* (2021.01); *H01M 50/529* (2021.01); *H01M 2220/20* (2013.01)

(58) Field of Classification Search
CPC .. H01M 50/451; H01M 50/51; H01M 50/529; H01M 2220/20
See application file for complete search history.

(56) References Cited

U.S. PATENT DOCUMENTS

2018/0062127 A1    3/2018  Lee et al.
2019/0355940 A1*  11/2019  Satou .................. H01M 50/103

FOREIGN PATENT DOCUMENTS

| | | |
|---|---|---|
| CN | 110518156 A | 11/2019 |
| CN | 110518174 A | 11/2019 |
| CN | 110571366 A | 12/2019 |
| CN | 110828717 A | 2/2020 |
| CN | 110828744 A | 2/2020 |
| CN | 110828745 A | 2/2020 |
| CN | 110828746 A | 2/2020 |
| EP | 3528312 A1 | 8/2019 |

\* cited by examiner

BATTERY, BATTERY MODULE, BATTERY PACK, AND ELECTRIC VEHICLE

CROSS-REFERENCE TO RELATED APPLICATIONS

This application is the National Stage of PCT International Application No. PCT/CN2021/070150, filed on Jan. 4, 2021, which claims priority to Chinese Patent Application No. 202010033794.7, entitled "BATTERY, BATTERY MODULE, BATTERY PACK, AND ELECTRIC VEHICLE" and filed by BYD Co., Ltd. On Jan. 13, 2020.

FIELD

The present disclosure belongs to the field of batteries, and more specifically, to a battery, a battery module, a battery pack, and an electric vehicle.

BACKGROUND

A battery pack applicable to an electric vehicle generally includes multiple batteries in order to increase a battery capacity, and the multiple batteries are mounted in a housing of the battery pack.

Electrolyte solution is required to be added to the batteries during manufacturing, and therefore the batteries are required to be sealed to prevent leakage of the electrolyte solution. In related arts, an electrode core is generally directly sealed in a shell, and then the electrolyte solution is injected through an injection port on the shell. Upon completion of injection of the electrolyte solution, the injection port is sealed to obtain the battery. However, in the above method, since the electrode core and the electrolyte solution are directly sealed in the shell of the battery, once the shell is damaged, the electrolyte solution is prone to leakage, and the sealing effect is relatively poor.

In addition, in order to increase the capacity of the battery, multiple electrode cores are connected in series in the shell of the battery. In the case of vibration and bumping, the multiple electrode cores are prone to movement in the shell, and relative displacement occurs between the electrode cores, which causes damage to the electrode core. For example, a current collector is damaged, a separator is wrinkled, an active material layer on an electrode plate is peeled off, stability of the battery is relatively poor, and a safety problem is prone to occurrence.

SUMMARY

The present disclosure is intended to resolve at least one of the technical problems in the related art to some extent.

A first aspect of the present disclosure provides a battery, including a metal shell and multiple electrode core assemblies sealed in the metal shell and arranged in sequence. The electrode core assemblies are connected in series. The battery further includes a packaging film arranged in the metal shell. The electrode core assemblies are sealed in the packaging film. An air pressure between the metal shell and the packaging film is lower than an air pressure outside the metal shell. An air pressure inside the packaging film is lower than the air pressure between the metal shell and the packaging film.

In some implementations of the present disclosure, one packaging film is arranged, and the multiple electrode core assemblies connected in series are sealed in the one packaging film. Each of the electrode core assemblies includes an electrode core assembly body and a first electrode and a second electrode electrically connected with the electrode core assembly body. For two electrode core assemblies connected in series, a position where the first electrode of one electrode core assembly and the second electrode of the other electrode core assembly are connected is located in the packaging film.

In some implementations of the present disclosure, a packaging portion is formed at a position on the packaging film corresponding to the first electrode and/or the second electrode, to isolate two adjacent electrode core assembly bodies. At least one of the first electrode of one of the two adjacent electrode core assemblies and the second electrode of the other of the two adjacent electrode core assemblies is arranged in the packaging portion.

In some implementations of the present disclosure, multiple packaging films are arranged. At least one of the electrode core assemblies is sealed in one of the packaging films. The electrode core assembly includes a first electrode and a second electrode configured to lead out a current. At least one of the first electrode and/or the second electrode extends out of the packaging film.

In some implementations of the present disclosure, the air pressure between the metal shell and the packaging film is P1, and P1 ranges from −100 Kpa to −5 Kpa.

In some implementations of the present disclosure, the air pressure P1 between the metal shell and the packaging film ranges from −75 Kpa to −20 Kpa.

In some implementations of the present disclosure, the air pressure inside the packaging film is P2, P1 and P2 satisfy P1>P2, and P1/P2 ranges from 0.05 to 0.85.

In some implementations of the present disclosure, a value of P2 ranges from −100 Kpa to −20 Kpa.

In some implementations of the present disclosure, a direction in which the electrode core assemblies are arranged is a first direction. A length of each of the electrode core assemblies extends along the first direction, a length of the battery extends along the first direction, and the length of the battery ranges from 400 mm to 2500 mm.

In some implementations of the present disclosure, a thickness of the battery extends along a second direction, the metal shell has two opposite first surfaces along the second direction, and at least one of the first surfaces is recessed into the metal shell.

In some implementations of the present disclosure, the two first surfaces are both recessed into the metal shell to hold the electrode core assemblies.

In some implementations of the present disclosure, the electrode core assembly includes a first electrode and a second electrode configured to lead out a current. The first electrode and the second electrode are respectively arranged on two sides of the electrode core assembly along the first direction.

In some implementations of the present disclosure, the battery is substantially a cuboid, and the thickness of the battery is larger than 10 mm.

In some implementations of the present disclosure, the thickness of the battery ranges from 13 mm to 75 mm.

In some implementations of the present disclosure, the packaging film includes a non-metallic outer film layer and a non-metallic inner film layer that are stacked. The inner film layer is arranged between the electrode core assembly and the outer film layer. A melting point of the outer film layer is greater than a melting point of the inner film layer. A difference between the melting point of the outer film layer and the melting point of the inner film layer ranges from 30° C. to 80° C.

In some implementations of the present disclosure, a material of the outer film layer is one or a combination of more than one of polyethylene terephthalate, polyamide, or polypropylene. A material of the inner film layer is one or a combination of more than one of polypropylene, polyethylene, or polyethylene terephthalate.

In some implementations of the present disclosure, the outer film layer and the inner film layer are bonded.

In some implementations of the present disclosure, a binder for the bonding is a polyolefin binder.

In some implementations of the present disclosure, the packaging film is an aluminum-plastic film.

In some implementations of the present disclosure, the metal shell includes a shell body with an opening and an end cover. The end cover is hermetically connected with the opening of the shell body to jointly define a hermetical accommodating chamber. The electrode core assemblies are arranged in the accommodating chamber. The electrode core assemblies are connected in series to form an electrode core string. Two ends of the electrode core string respectively include a first electrode and a second electrode, and the first electrode and the second electrode are respectively led out through the end cover.

In some implementations of the present disclosure, an exhaust hole is provided on the metal shell, and a sealing member is arranged in the exhaust hole.

In some implementations of the present disclosure, a thickness of the metal shell ranges from 0.05 mm to 1 mm.

A second aspect of the present disclosure provides a battery module, including the battery according to any of the above.

A third aspect of the present disclosure provides a battery pack, including a battery sequence. The battery sequence includes multiple batteries. Each battery includes a metal shell and multiple electrode core assemblies sealed in the metal shell and arranged in sequence, and the electrode core assemblies are connected in series. The battery further includes a packaging film arranged in the metal shell. The electrode core assemblies are sealed in the packaging film. An air pressure between the metal shell and the packaging film is lower than an air pressure outside the metal shell. An air pressure inside the packaging film is lower than the air pressure between the metal shell and the packaging film.

In some implementations of the present disclosure, a thickness of the battery extends along a second direction, and the multiple batteries are arranged in sequence along the second direction to form the battery sequence. A gap is provided between at least two adjacent batteries, and a ratio of the gap to the thickness of the battery ranges from 0.001 to 0.15.

In some implementations of the present disclosure, the metal shell includes a shell body with an opening and an end cover. The end cover is hermetically connected with the opening of the shell body to jointly define a hermetical accommodating chamber. The electrode core assemblies are arranged in the accommodating chamber. The gap between the two adjacent batteries includes a first gap d1. The first gap is a minimum distance between two end covers of the two adjacent batteries along the second direction. The thickness of the battery is a dimension of the end cover along the second direction, and a ratio of the first gap d1 to the thickness of the battery ranges from 0.005 to 0.1.

In some implementations of the present disclosure, the metal shell includes a shell body with an opening and an end cover. The end cover is hermetically connected with the opening of the shell body to jointly define a hermetical accommodating chamber. The electrode core assemblies are arranged in the accommodating chamber. The metal shell has two opposite first surfaces along the second direction. The gap between the two adjacent batteries includes a second gap d2. The second gap is a minimum distance between the two first surfaces of the two adjacent batteries facing each other. The thickness of the battery is the dimension of the end cover along the second direction.

In some implementations of the present disclosure, the second gap d2 of the battery before use is larger than the second gap d2 after use.

In some implementations of the present disclosure, the battery pack further includes a battery pack cover and a tray. The battery pack cover is hermetically connected with the tray to form a battery accommodating cavity. The battery sequence is arranged in the battery accommodating cavity. The tray includes a support member. A support region is formed on the metal shell. The battery is butted with the support member by the support region and is supported on the support member.

In some implementations of the present disclosure, a length of the battery extends along a first direction. The first direction is perpendicular to the second direction. The tray includes a side beam. The side beam is the support member. Two ends of the battery along the first direction are supported on the side beam.

A fourth aspect of the present disclosure provides an electric vehicle, including the battery pack according to any of the above.

Compared with related arts, the present disclosure has the following beneficial effects. In the battery of the present disclosure, the electrode core assemblies are sealed in the packaging film, and are sealed in the metal shell to perform secondary sealing. Therefore, a double-layer sealing effect of the packaging film and the metal shell may effectively improve the sealing effect. In addition, the difference between air pressures of the metal shell and the packaging film is lower than the air pressure outside the metal shell, and the metal shell and the inner electrode core are as close as possible. In this way, an internal gap is reduced, and the electrode core is prevented from moving in the metal shell. In addition, displacement of the electrode cores relative to each other can be avoided, and damage to a current collector, wrinkling of a separator, and falling of an active material can be reduced, thereby enhancing the mechanical strength of the entire battery, extending the service life of the battery, and improving safety performance of the battery. Multiple electrode cores are sealed in one metal shell, so as to manufacture the battery with a relatively long length more conveniently. Therefore, according to the solution of the present disclosure, the battery with a relatively long length and better strength may be easily realized. In this way, when the battery is mounted in the housing of the battery pack, an arrangement of a support structure such as a transverse beam and a longitudinal beam in the battery pack body can be reduced, and the battery itself may be configured as a support and is directly mounted on the housing of the battery pack. Thus, an internal space of the battery pack can be saved, the volume utilization of the battery pack can be increased, and a weight of the battery pack can be reduced.

Additional aspects and advantages of the present disclosure are partially provided in the following description, and partially become apparent in the following description or understood through the practice of the present disclosure.

REFERENCE NUMERALS

100: Battery;
11: Metal shell; 12: Electrode core assembly; 13: Packaging film;
111: Shell body; 112: End cover; 113: First surface; 114: Recess;
121: First electrode; 122: Second electrode;
131: Packaging portion;
200: Battery pack;
300: Battery module;
400: Electric vehicle;
21: Battery sequence; 22: Tray; 221: Support member;
L: Length of battery;
D: Thickness of battery;
A: First direction; B: Second direction.

DETAILED DESCRIPTION

Embodiments of the present disclosure are described in detail below, and examples of the embodiments are shown in the accompanying drawings, where the same or similar elements or the elements having the same or similar functions are denoted by the same or similar reference numerals throughout the description. The embodiments described below with reference to the accompanying drawings are exemplary and used only for explaining the present disclosure, and should not be construed as a limitation on the present disclosure.

In the description of the present disclosure, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "axial direction", "radial direction", and "circumferential direction" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of the present disclosure.

As shown in FIG. 1 to FIG. 5, the present disclosure provides a battery 100. The battery 100 is, for example, a battery configured to form a battery pack. The battery 100 includes a metal shell 11 and multiple electrode core assemblies 12 sealed in the metal shell 11 and arranged in sequence. The electrode core assemblies 12 are connected in series, and each of the electrode core assemblies 12 includes at least one electrode core. The electrode core assembly 12 includes a first electrode 121 and a second electrode 122 configured to lead out a current. In an embodiment, the electrode core assembly 12 includes an electrode core assembly body 123 and a first electrode 121 and a second electrode 122 electrically connected with the electrode core assembly body 123. For two electrode core assemblies 12 connected in series, the first electrode 121 of one electrode core assembly 12 is connected with the second electrode of the other electrode core assembly 12. The multiple electrode core assemblies 12 are connected in series, so that a capacity and a voltage of a single battery can be increased, and the manufacturing process and costs can be reduced.

Figure 1:
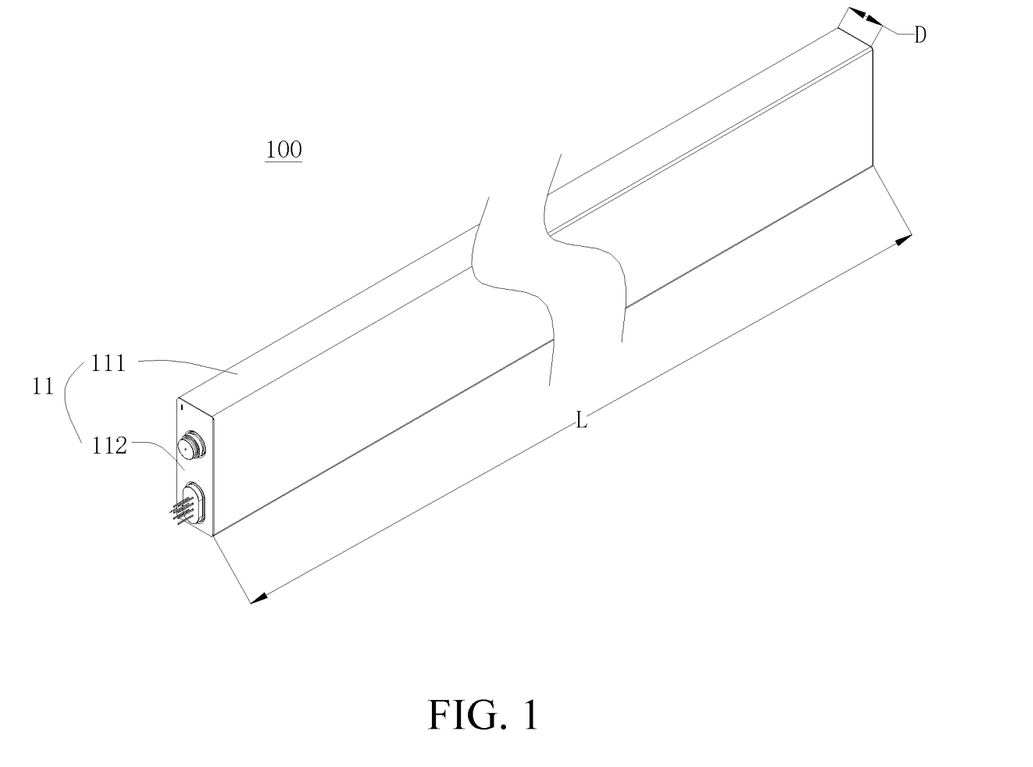
FIG. 1 is a three-dimensional schematic structural diagram of a battery according to an embodiment of the present disclosure.
Figure 2:
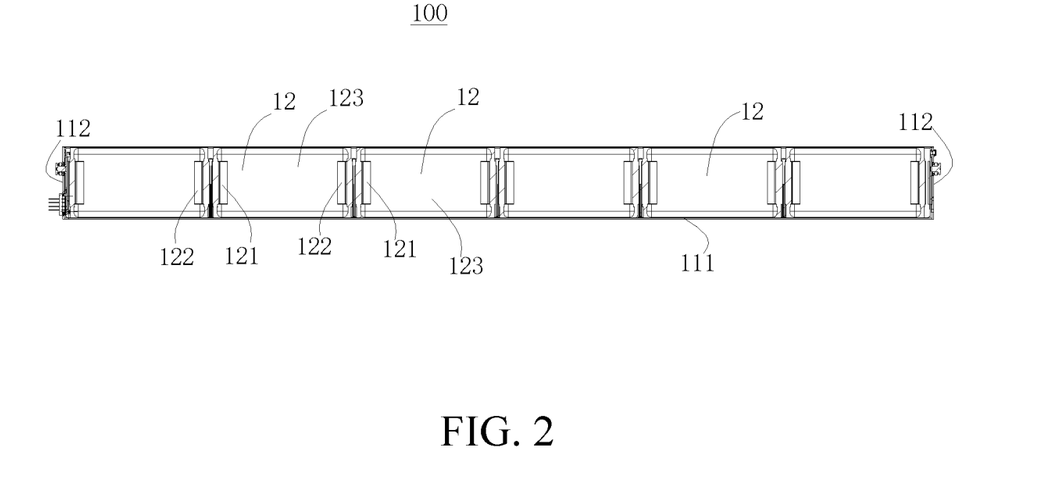
FIG. 2 is a schematic cross-sectional view of a battery according to an embodiment of the present disclosure.

It should be noted that, the series connection in this embodiment may be a series connection between adjacent electrode core assemblies 12. A specific implementation may be that the first electrodes 121 and the second electrodes 122 on the adjacent electrode core assemblies are directly connected, or the electrical connection may be realized by an additional conductive component. In a case that the electrode core assembly 12 includes only one electrode core, the first electrode 121 and the second electrode 122 may be respectively a positive tab and a negative tab of the electrode core, or respectively the negative tab and the positive tab of the electrode core. In a case that the electrode core assembly includes multiple electrode cores, lead-out members of the first electrode 121 and the second electrode 122 may be electrode leads. Alternatively, one of the first electrode 121 and the second electrode 122 is the lead-out member formed by combining and welding together the positive tabs of the multiple electrode cores, and the other of the first electrode and the second electrode is the lead-out member formed by combining and welding together the negative tabs of the multiple electrode cores.

In the present disclosure, "first" and "second" in the first electrode 121 and the second electrode 122 are only used for distinguishing between names, and are not used for limiting the number. For example, the first electrode 121 may include one first electrode 121, or may include multiple first electrodes 121.

In an embodiment, the metal shell 11 includes a shell body 111 with an opening and an end cover 112. The end cover 112 is hermetically connected with the opening of the shell body 111 to jointly define a hermetical accommodating chamber, and the multiple electrode core assemblies 12 are arranged in the accommodating chamber. The multiple electrode core assemblies 12 are connected in series to form an electrode core string. Two ends of the electrode core string respectively include a first electrode and a second electrode. The first electrode of the electrode core string is the first electrode 121 of the electrode core assembly 12 arranged on one end of the electrode core string, and the second electrode of the electrode core string is the second electrode 122 of the electrode core assembly 12 arranged on an other end of the electrode core string. The first electrode and the second electrode of the electrode core string are respectively led out through the end cover 112.

In some implementations, the shell body 111 may be provided with an opening at both ends, and two end covers 112 may be arranged, so that the two end covers 112 are respectively hermetically connected with the opening at both ends of the shell body 111 to form a hermetical accommodating chamber. In this manner, the first electrode and the second electrode of the electrode core string may be led out through the same end cover 112, or may be respectively led out through two end covers 112, which is not limited.

In some implementations, the shell body 111 may be provided with an opening only on one end, and one end cover 112 is arranged, so that the end cover 112 is hermetically connected with the opening on one end of the shell body 111. In this manner, the first electrode and the second electrode of the electrode core string are led out through the same end cover 112.

In the embodiment of the present disclosure, the battery 100 further includes a packaging film 13 arranged in the metal shell 11, and the electrode core assembly 12 is sealed in the packaging film 13, that is to say, the packaging film 13 is further arranged between the metal shell 11 and the electrode core assembly 12. In this way, a secondary packaging of the electrode core assembly 12 may be achieved by using the packaging film 13 and the metal shell 11, which is beneficial to improve the sealing effect of the battery. It may be understood that the packaging film 13 is further injected with electrolyte solution. Therefore, in the above manner, contact between the electrolyte solution and the metal shell 11, and corrosion of the metal shell 11 or decomposition of the electrolyte solution may further be avoided.

An air pressure between the metal shell 11 and the packaging film 13 is lower than an air pressure outside the metal shell 11.

In the present disclosure, the "air pressure" is short for an atmospheric pressure. The air pressure is the atmospheric pressure acting on a unit area, which is a weight of a vertical air column extending upward to an upper bound of the atmosphere on the unit area.

The air pressure between the metal shell 11 and the packaging film 13 is the air pressure in a space between the metal shell 11 and the packaging film 13, and is lower than the air pressure outside the metal shell 11. Therefore, in the embodiment of the present disclosure, a negative pressure exists between the metal shell 11 and the packaging film 13. In this way, the metal shell 11 is recessed or deformed under the action of atmospheric pressure, a gap between the metal shell 11 and the electrode core assembly 12 is reduced accordingly, and a space for movement or displacement of the electrode core assemblies 12 relative to each other is reduced. Therefore, the movement of the electrode core assembly 12 and displacement of the electrode core assemblies 12 relative to each other can be reduced, and the stability of the battery 100, the strength of the battery 100, and the safety performance of the battery 100 can be improved.

For example, the space between the metal shell 11 and the packaging film 13 may be vacuumized, so that a negative pressure exists between the metal shell 11 and the packaging film 13. In this way, the metal shell 11 and the inner electrode core assembly 12 may be as close as possible, so as to reduce the inner gap and prevent the electrode core assembly from moving in the metal shell. In addition, displacement of the electrode core assemblies relative to each other can be avoided, and damage to a current collector, wrinkling of a separator, and falling of an active material can be reduced, thereby enhancing the mechanical strength of the entire battery, extending the service life of the battery, and improving safety performance of the battery.

In an implementation, the air pressure between the metal shell 11 and the packaging film 13 is P1. A value of P1 may range from $-100$ Kpa to $-5$ Kpa. In an embodiment, the value of P1 may range from $-75$ Kpa to $-20$ Kpa. Certainly, those skilled in the art may set the value of P1 according to an actual need.

The air pressure inside the packaging film 13 is P2. P1 and P2 satisfy P1>P2, and P1/P2 ranges from 0.05 to 0.85.

A value of P2 may range from $-100$ Kpa to $-20$ Kpa.

P1, P2, and P1/P2 are limited within the above range. The electrode core assembly 12 in the art adopts a secondary sealing mode. The electrode core assembly 12 is first sealed in the packaging film 13. In order to avoid damage to the packaging film 13 due to a bulge of the packaging film 13 caused by an excessively large internal air pressure, the air pressure between the metal shell 11 and the packaging film 13 is set to be greater than the air pressure inside the packaging film 13. In addition, it has been verified through a large number of experiments that when P1/P2 is in the above range, reliability of the secondary sealing of the battery is desirably ensured. In addition, the gap between the electrode plates is reduced, so that lithium ions can be better conducted.

In some implementations, the air pressure inside the packaging film 13 is lower than the air pressure between the metal shell 11 and the packaging film 13.

Figure 3:
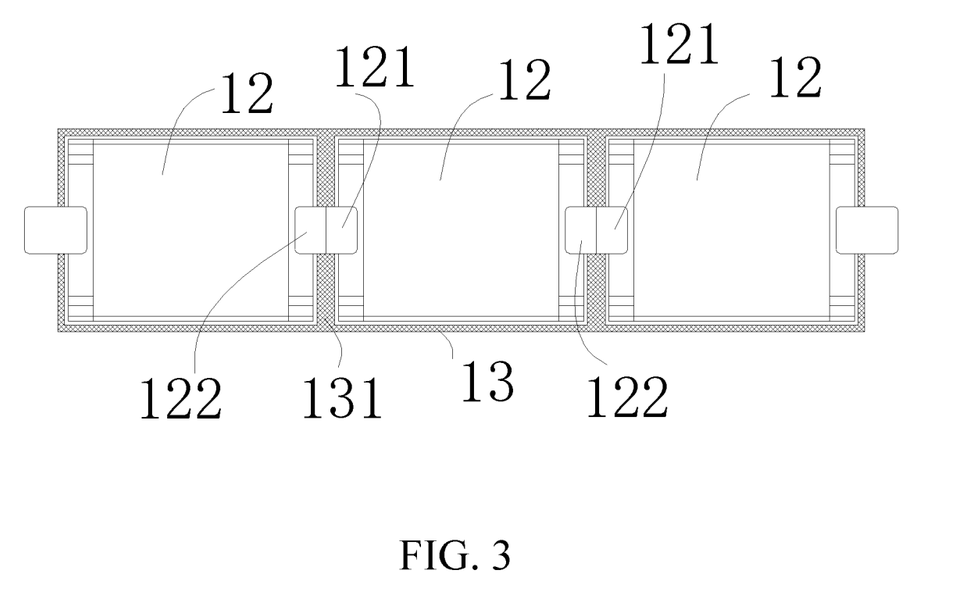
FIG. 3 is a schematic diagram of an electrode core assembly sealed in a packaging film according to an embodiment of the present disclosure.

In an embodiment of the present disclosure, there is one packaging film 13. In other words, one packaging film 13 is arranged, and multiple electrode core assemblies 12 connected in series are sealed in the one packaging film 13. Each of the electrode core assemblies 12 includes an electrode core assembly body 123 and a first electrode 121 and a second electrode 122 electrically connected with the electrode core assembly body 123 and configured to lead out a current. For two electrode core assemblies 12 connected in series, a position where the first electrode 121 of one electrode core assembly 12 and the second electrode 122 of the other electrode core assembly 12 are connected is located in the packaging film 13. That is to say, the packaging film 13 is integrally arranged, and the multiple electrode core assemblies 12 are sealed in the one packaging film 13.

In actual application, for example, as shown in FIG. 3, the multiple electrode core assemblies 12 may be connected in series, and then a whole packaging film 13 is used to wrap the electrode core assemblies 12 connected in series. For example, the electrode core assemblies 12 connected in series may be placed on a region of the packaging film 13 (or a groove may be provided on a part of the packaging film 13 in advance, and then the multiple electrode core assemblies 12 connected in series are placed in the groove), then another region of the packaging film 13 is folded toward the electrode core assemblies 12, and then the packaging film 13 in the two regions is heat-melted and sealed by hot melting. In this way, the electrode core assemblies 12 connected in series are sealed in the one packaging film 13.

A packaging portion 131 is formed at a position on the packaging film 13 corresponding to the first electrode 121 and/or the second electrode 122, to isolate two adjacent electrode core assembly bodies 123. For two adjacent electrode core assemblies 12 connected in series, at least one of the first electrode 121 of one electrode core assembly 12 and the second electrode 122 of the other electrode core assembly 12 is arranged in the packaging portion 131. The multiple electrode core assembly bodies 123 are isolated by the packaging portion 131, so as to prevent the electrolyte solution among the multiple electrode core assemblies 12 from circulating. In this way, the multiple electrode core assemblies 12 do not affect each other, and the electrolyte solution in the multiple electrode core assemblies 12 is not decomposed due to an excessively large potential difference, thereby ensuring the safety and the service life of the battery.

The packaging portion 131 may have multiple implementations. For example, the packaging film 13 may be fastened with cable ties to form the packaging portion 131, or the packaging film 13 may be directly hot melted and connected to form the packaging portion 131. The specific implementation of the packaging portion 131 is not particularly limited.

Figure 4:
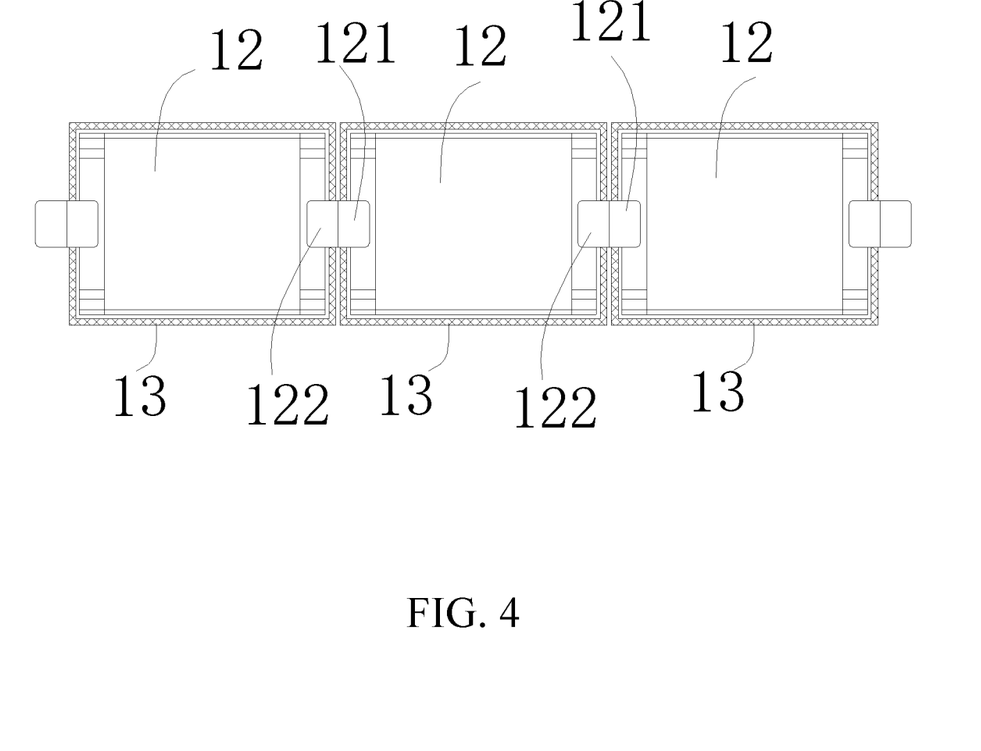
FIG. 4 is another schematic diagram of an electrode core assembly sealed in a packaging film according to an embodiment of the present disclosure.

In another embodiment of the present disclosure, as shown in FIG. 4, there are multiple packaging films 13, that is to say, multiple packaging films 13 are arranged. At least one electrode core assembly 12 is sealed in a packaging film 13 to form an electrode core assembly, and the electrode core assemblies are connected in series.

In other words, a number of packaging films 13 and a number of electrode core assemblies 12 are in a one-to-one correspondence. Each electrode core assembly 12 is individually sealed in one packaging film 13. In the implementation, after multiple electrode core assemblies 12 are manufactured, one packaging film 13 may be covered outside each electrode core assembly 12, and then the electrode core assemblies are connected in series.

At least one of the first electrode 121 and the second electrode 122 of the electrode core assembly 12 extends out of the packaging film 13. For example, the first electrode 121 may extend out of the packaging film 13, or the second electrode 122 may extend out of the packaging film 13, or both the first electrode 121 and the second electrode 122 extend out of the packaging film 13. At least one of the first electrode 121 and/or the second electrode 122 extends out of the packaging film 13, and the extended electrode may be used to connect other electrode core assemblies in series.

In the embodiment of the present disclosure, a direction in which the multiple electrode core assemblies 12 are arranged is a first direction A, a length direction of the electrode core assemblies 12 extends along the first direction A, and a length of the battery also extends along the first direction A. That is, the multiple electrode core assemblies 12 are arranged in sequence along the length direction of the battery, and the first electrode 121 and the second electrode 122 of the electrode core assemblies 12 are respectively arranged on both sides of the electrode core assemblies 12 along the first direction A. That is to say, the multiple electrode core assemblies 12 are arranged in a "head-to-head" arrangement. With this arrangement, the electrode core assemblies 12 can be easily connected in series in pairs, and a connection structure is simple. In addition, this arrangement may facilitate manufacturing of the battery 100 with a longer length. Thus, when the battery 100 is mounted in a housing of the battery pack, support structures such as cross bars and longitudinal bars are not required to be arranged, and the battery 100 is directly mounted to the housing of the battery pack by using the metal shell 11 of the battery 100 as a support, thereby saving an internal space of the battery pack, increasing the volume utilization of the battery pack, and reducing a weight of the battery pack.

The battery is substantially a cuboid, and a length L of the battery ranges from 400 mm to 2500 mm (millimeter), for example, may be 500 mm, 1000 mm, or 1500 mm. Compared with the existing manner of arranging only one electrode core, arranging multiple electrode core assemblies 12 in the battery can facilitate manufacturing of the battery with a relatively long length. In a conventional battery, once the battery is relatively long, a length of the copper aluminum foil configured as a current collector inside the battery is increased accordingly, an internal resistance of the battery is greatly increased, and the increasingly high requirements for power and quick charge cannot be satisfied. In a case that the batteries have a same length, the embodiment of the present disclosure may greatly reduce the internal resistance of the battery, and avoid a problem caused by overheating of the battery in the case of high power output, quick charge, and the like.

A thickness D of the battery may be larger than 10 mm, for example, may range from 13 mm to 75 mm.

Figure 5:
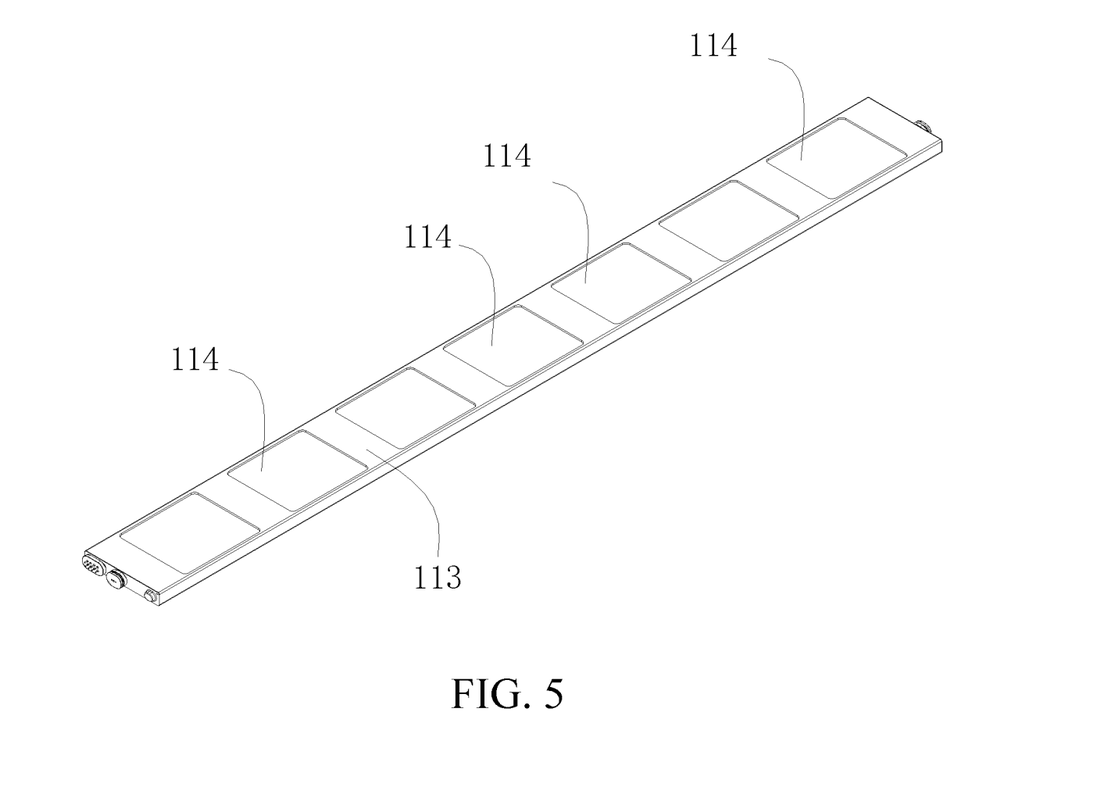
FIG. 5 is a schematic diagram of a first surface of a metal shell having a recess formed according to an embodiment of the present disclosure.

In the embodiment of the present disclosure, the thickness of the battery 100 extends along a second direction B perpendicular to the first direction A. The metal shell 11 has two opposite first surfaces 113 along the second direction B, and the first surface 113 is a largest surface of the battery. At least one of the first surfaces 113 is recessed into the metal shell 11, so that the metal shell 11 and the electrode core assembly 12 may be attached as closely as possible.

Since the thickness of the metal shell 11 is relatively small and is a relatively thin sheet, a recess 114 on the first surface 113 of the metal shell 11 may be, for example, formed when the inside of the metal shell 11 is vacuumized. That is to say, when the space between the metal shell 11 and the packaging film 13 is vacuumized, the air pressure between the metal shell 11 and the packaging film 13 is lower than the air pressure outside the metal shell 11, as the vacuumizing proceeds, the first surface 113 of the metal shell 11 is easily recessed into the metal shell 11 to form the recess 114.

During normal use of the battery, due to reasons such as expansion of the material itself, gas production by the electrolyte solution, and the like, the battery is generally expanded, and a region with greatest expansion and deformation is often on the largest surface of the battery. By using the technology, the largest surface of the battery in an initial state is limited, by vacuumizing, to be slightly recessed, which can effectively alleviate squeezing between the batteries after being expanded, thereby increasing the life and improving the safety performance of the batteries and the entire system.

In some other embodiments, as shown in FIG. 5, the inside of the metal shell 11 may be vacuumized after the recess 114 is formed on the first surface 113 of the metal shell 11 in advance. There may be multiple recesses 114 on the first surface 113 of the metal shell 11. For example, multiple recesses 114 are formed on the first surface 113 in advance, and a position of each recess 114 corresponds to a position at which one electrode core assembly is located.

In some implementations, two opposite first surfaces 113 of the metal shell 11 are both recessed inward, so that a recessed region can hold the electrode core assemblies 12.

An exhaust hole may be provided on the metal shell 11, and the space between the metal shell 11 and the packaging film 13 is vacuumized through the exhaust hole. The exhaust hole is required to be sealed, and therefore a sealing member is further arranged in the exhaust hole to cover the exhaust hole. The sealing member may be, for example, a plug, a rubber member, and the like, which is not limited thereto.

In some implementations, before the metal shell 11 is vacuumized, a gap is provided between the electrode core assembly 12 and an inner surface of the metal shell 11. The gap facilitates mounting of the electrode core assembly 12 into the metal shell 11. After the metal shell 11 is vacuumized, the metal shell 11 is pressed against an outer surface of the electrode core assembly 12 along the second direction B to hold the electrode core assembly 12. Therefore, the space for the electrode core assembly to move inside the metal shell is reduced, and the safety performance of the battery is improved.

In the embodiment of the present disclosure, the metal shell 11 has a high strength and an effective heat dissipation effect. The metal shell 11 may include but is not limited to an aluminum shell or a steel shell.

In some embodiments, the thickness of the metal shell 11 ranges from 0.05 mm to 1 mm.

A relatively large thickness of the metal shell 11 increases the weight of the battery 100 and reduces the capacity of the battery 100. In addition, due to the excessively large thickness of the metal shell 11, the metal shell 11 cannot be easily recessed or deformed toward the electrode core assembly 12 under the action of the atmospheric pressure. As a result, the distance between the metal shell 11 and the electrode core assembly 12 cannot be reduced, and the electrode core assembly 12 cannot be effectively positioned. Moreover, the excessively large thickness of the metal shell 11 increases costs for vacuumizing, and increases manufacturing costs.

In the present disclosure, the thickness of the metal shell 11 is defined within the above range, which not only can ensure the strength of the metal shell 11 but also may not reduce the capacity of the battery 100. Moreover, the metal shell 11 can be deformed more easily in the negative pressure state, so that the distance between the metal shell 11 and the electrode core assembly 12 can be reduced, thereby reducing movement of the electrode core assembly 12 inside the metal shell 11 and displacement of the electrode core assemblies 12 relative to each other.

In the embodiment of the present disclosure, the packaging film 13 includes a non-metallic outer film layer and a non-metallic inner film layer that are stacked, and the inner film layer is arranged between the outer film layer and the electrode core assembly.

The inner film layer has desirable chemical stability, for example, a material with corrosion resistance of the electrolyte solution may be used. For example, the material may be polypropylene (PP), polyethylene (PE), or polyethylene terephthalate (PET), or may be a combination of more than one of the above materials.

The outer film layer is a protective layer, and the outer film layer may be used to prevent penetration of air, especially water vapor, oxygen, and the like. The material of the outer film layer may be, for example, PET, polyamide (PA), or PP, or may be a combination of more than one of the above materials.

In the packaging film 13 of this embodiment, a melting point of the outer film layer is greater than a melting point of the inner film layer, so that the outer film layer is not melted during sealing by hot melting, and the inner film layer can be melted in time to ensure excellent sealing property.

In an embodiment, a difference between the melting point of the outer film layer and the melting point of the inner film layer ranges from 30° C. to 80° C. For example, the difference between the two melting points may be 50° C., 70° C., or the like. A specific material may be determined according to an actual need.

The non-metallic outer film layer and the non-metallic inner film layer are bonded and combined by using an adhesive. For example, a material of the outer film layer may be PP, a material of the inner film layer may be PET, and a binder for bonding the outer film layer and the inner film layer may be, for example, a polyolefin binder, so as to form a complex film by bonding.

In this embodiment, the electrode core assembly is sealed by using a double-layer non-metallic film to form a packaging film. Since the non-metallic packaging film has a higher tensile strength and elongation at break, limitation on the thickness of the battery may be reduced, so that the produced battery has a larger thickness. The thickness of the battery in this embodiment may be increased and has a wide range, for example, may be larger than 10 mm, for example, may range from 13 mm to 75 mm.

In some implementations of the present disclosure, the packaging film may an aluminum-plastic film.

In an embodiment of the present disclosure, the battery is a lithium-ion battery.

Figure 8:
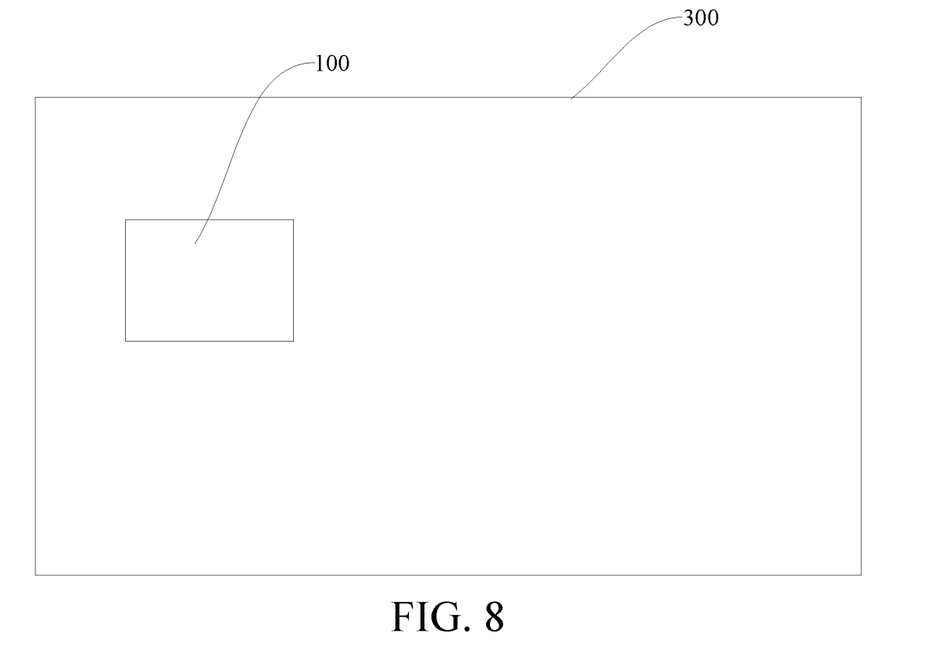
FIG. 8 is a schematic diagram of a relationship between a battery module and a battery according to an embodiment of the present disclosure.

Another aspect of the present disclosure provides a battery module 300, including the battery of any of the above embodiments. By using the battery module 300 provided in the present disclosure, the sealing property is improved, a number of assembly processes is decreased, and battery costs are reduced.

Figure 6:
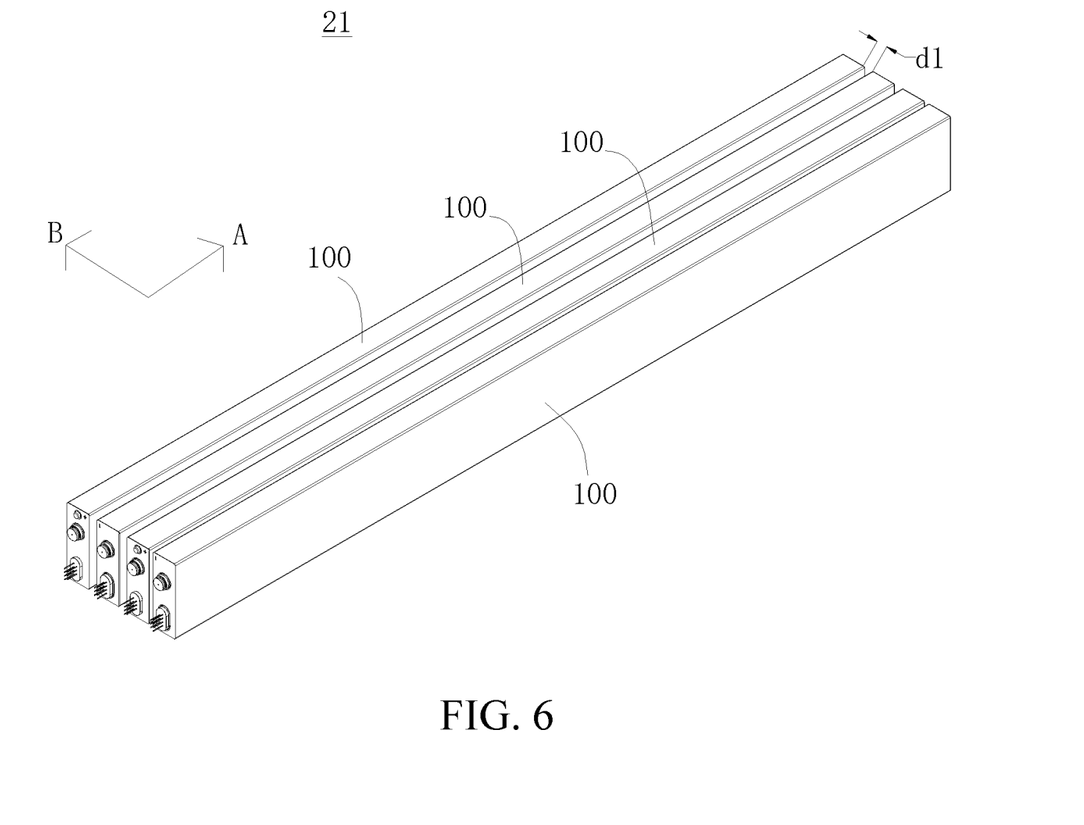
FIG. 6 is a schematic structural diagram of a battery sequence according to an embodiment of the present disclosure.
Figure 7:
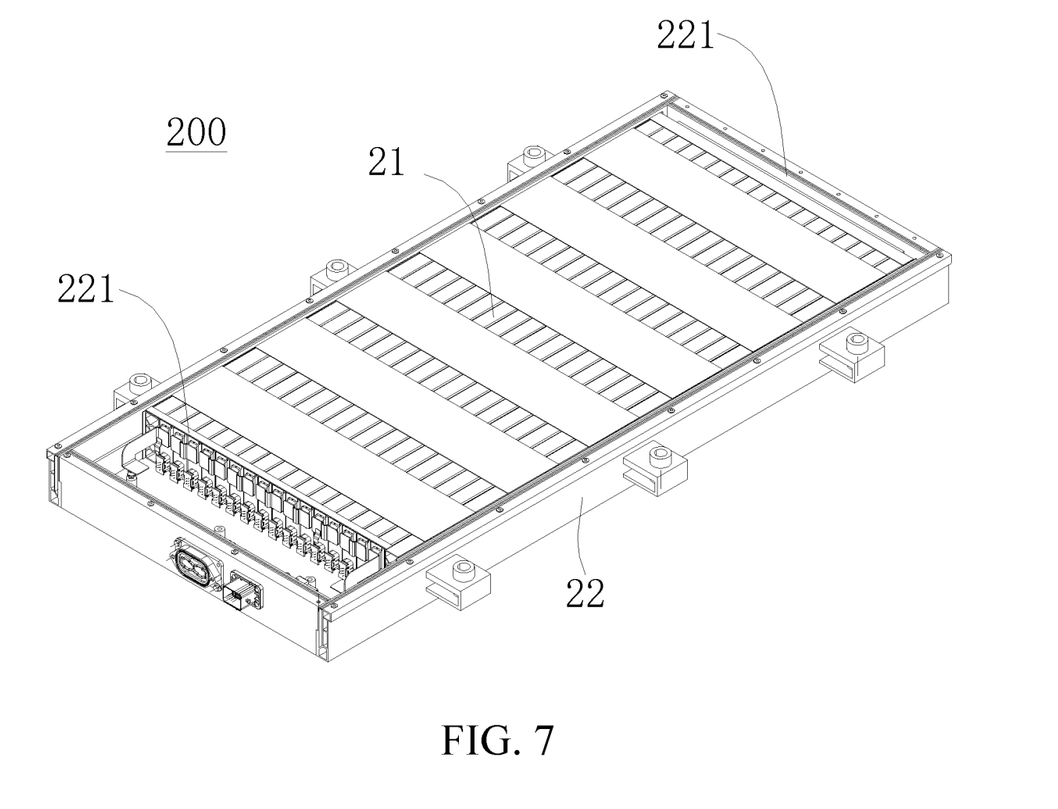
FIG. 7 is a schematic structural diagram of a battery pack according to an embodiment of the present disclosure.

Referring to FIG. 6 and FIG. 7, the present disclosure further provides a battery pack 200, including a battery sequence 21. The battery sequence 21 includes multiple batteries 100. Each of the batteries 100 is the battery 100 described in any of the above embodiments. Therefore, the specific structure of the battery 100 is not described herein one by one.

One or more battery sequences 21 may be arranged, and one or more batteries 100 may be arranged in each battery sequence 21. In actual production, the number of batteries 100 and the number of battery sequences 21 may be set according to actual requirements. This is not specifically limited in the present disclosure.

In the embodiment of the present disclosure, a length direction of the battery 100 extends along a first direction A, and a thickness direction of the battery extends along a second direction B perpendicular to the first direction A. The multiple batteries 100 are arranged in sequence along the second direction B to form the battery sequence 21. A gap is provided between at least two adjacent batteries 100. A ratio of the gap to a thickness of the battery 100 ranges from 0.001 to 0.15.

It should be noted that the gap between two adjacent batteries varies with an increase of an operating time of the batteries. During operation, after operation, or before the batteries leave the factory, as long as the ratio of the gap between the batteries to the thickness falls within the scope defined in the present disclosure, the gap falls within the protection scope of the present disclosure.

In the present disclosure, a certain gap reserved between the batteries 100 may reserve a buffer space for expansion of the batteries 100.

The expansion of the batteries 100 is related to the thicknesses of the batteries 100. A battery 100 with a larger thickness is more likely to expand. In the present disclosure, the ratio of the gap between the batteries 100 to the thickness of the battery 100 is restricted to 0.001-0.15. In this way, a space of the battery pack 200 can be fully used, thereby improving utilization of the battery pack 200, and relatively effective cushion can be provided for the expansion of the batteries 100.

In addition, heat is generated when the battery 100 expands. Therefore, the gap reserved between the batteries 100 can be used as a heat dissipation channel, such as an air channel, so that a surface of the battery 100 with a larger area has a better heat dissipation effect. In this way, heat dissipation efficiency and safety performance of the battery pack 200 can be improved.

In the above solution, the gap between the batteries 100 may mean that a certain space is simply reserved between the batteries 100 and no structural member is arranged between the batteries, or may mean that an additional structural member is arranged between the batteries 100 to separate the batteries 100 from each other.

It should be noted that, when a structural member is arranged between the batteries 100, the gap between the batteries 100 should be understood as a distance between the batteries 100 on two sides of the structural member rather than a distance between the structural member and each battery 100.

It should be noted that, a certain gap may be reserved between the structural member and each of the batteries 100 on the two sides of the structural member, or the structural member may be in direct contact with the batteries. When the structural member is in direct contact with the batteries 100 arranged on the two sides, the structural member is required to have a certain flexibility, so as to provide cushion for the expansion of the batteries 100. The structural member includes but is not limited to an aerogel, a thermally conductive structural adhesive, or a thermal insulation foam.

In the present disclosure, when multiple battery sequences 21 are arranged, the gap is defined as a distance between two adjacent batteries 100 in a same battery sequence 21 rather than a distance between two adjacent batteries in different battery sequences 21. In addition, in the same battery sequence 21, a certain gap may be reserved between every two adjacent batteries, or a certain gap may be reserved between some two adjacent batteries.

In an implementation, the gap between two adjacent batteries 100 includes a first gap d1. The first gap d1 is defined as a minimum distance between two end covers 112 of the two adjacent batteries along the second direction B, the thickness of the battery 100 is a dimension of the end cover 112 along the second direction B. A ratio of the first gap d1 to the thickness of the battery 100 ranges from 0.005 to 0.1.

In the above implementation, since the end cover 112 has a relatively high strength, the end cover is less likely to expand than a shell body 111. After the battery 100 operates for a period of time, a chemical reaction occurs inside the battery, and the battery 100 expands and squeezes adjacent batteries 100. Therefore, the first gap d1 changes (for example, the first gap gradually increases). However, the change is relatively small and can be ignored. Alternatively, even if the first gap changes, the ratio of the first gap to the thickness of the battery 100 still satisfies the above range. In the above implementation, two ends of the shell body 111 each are provided with the end cover 112. When the batteries 100 are arranged into the battery sequence 21 along the thickness direction, the gap between the two batteries 100 is defined as a minimum distance between two end covers 112 arranged on a same end of the battery sequence 21 rather than a distance between two end covers 112 arranged on different ends of the batteries 100.

In an implementation, the gap between the two adjacent batteries 100 includes a second gap d2. The second gap d2 is defined as a minimum distance between two first surfaces of the two adjacent batteries 100 facing each other. The second gap d2 of the battery 100 before use is larger than the second gap d2 after use.

Figure 9:
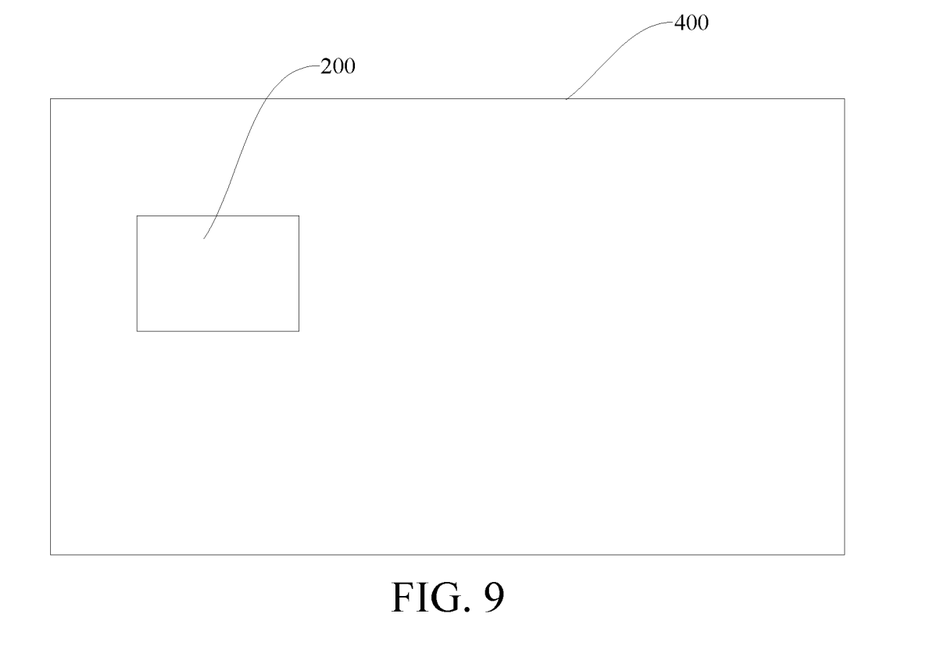
FIG. 9 is a schematic diagram of a relationship between an electric vehicle and a battery pack according to an embodiment of the present disclosure.

The expression "before use" may be understood as a time point before the batteries 100 are delivered from the factory after assembly or before the batteries start supplying electric energy to the outside after the batteries are delivered from the factory. The expression "after use" may be understood as a time point after the batteries 100 start supplying electric energy to the outside. For example, the battery pack 200 is assembled on an electric vehicle 400. In this case, the state before use may be understood as a state of the new vehicle, and the state after use may be understood as a state of the vehicle after traveling for a mileage.

In this implementation, the second gap is defined as a minimum distance between two opposite first surfaces of two adjacent batteries 100, and the distance gradually decreases with an increase of a service time of the batteries. A main reason is that after the batteries expand, the distance between two adjacent largest surfaces gradually decreases.

In the embodiment of the present disclosure, the battery pack 200 further includes a battery cover and a tray 22. The battery cover is not shown in a view of FIG. 7. The battery cover and the tray 22 are hermetically connected to form a battery accommodating cavity, and the battery sequence 21 is arranged in the battery accommodating cavity. The tray 22 includes a support member 221, and a support region is formed on the metal shell 11 of the batteries 100. The batteries 100 are butted with the support member 221 through the support region of the batteries and are supported on the support member 221.

In an embodiment, the tray 22 includes a side beam. The side beam is configured as the support member 221, and two ends of the batteries 100 along the length direction are supported on the side beam. That is to say, two ends of the batteries 100 along the second direction B are supported on the side beam.

In the battery 100 of the embodiments of the present disclosure, an air pressure between the metal shell 11 and the packaging film 13 is a negative pressure, which can improve an overall strength of the battery. Therefore, the battery 100 may be directly mounted to the tray 22 by using the strength of the battery as a support. In this way, the structure such as a transverse beam or a longitudinal beam is not required to be arranged on the tray 22 to support the battery 100, and the utilization of the internal space of the battery pack is increased.

An electric vehicle 400 includes the above battery pack 200. By using the electric vehicle 400 provided in the present disclosure, a high mile range and low costs are realized.

In the description of the present disclosure, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In description of this specification, description of reference terms such as "an embodiment", "specific embodiments", or "an example", means including specific features, structures, materials, or features described in the embodiment or example in at least one embodiment or example of the present disclosure. In this specification, schematic descriptions of the foregoing terms do not necessarily point at a same embodiment or example. In addition, the described specific features, structures, materials, or characteristics may be combined in a proper manner in any one or more of the embodiments or examples.

Although the embodiments of the present disclosure have been shown and described, persons of ordinary skill in the art should understand that various changes, modifications, replacements and variations may be made to the embodiments without departing from the principles and spirit of the present disclosure, and the scope of the present disclosure is as defined by the appended claims and their equivalents.

What is claimed is:

1. A battery, comprising a metal shell and a plurality of electrode core assemblies sealed in the metal shell and arranged in sequence, wherein the electrode core assemblies are connected in series;
the battery further comprises a packaging film arranged in the metal shell; the electrode core assemblies are sealed in the packaging film; an air pressure between the metal shell and the packaging film is lower than an air pressure outside the metal shell; and an air pressure inside the packaging film is lower than the air pressure between the metal shell and the packaging film, wherein the air pressure between the metal shell and the packaging film is P1; and P1 ranges from −100 Kpa to −5 Kpa.

2. The battery according to claim 1, wherein one packaging film is arranged; the plurality of electrode core assemblies connected in series are sealed in the one packaging film;
each of the electrode core assemblies comprises an electrode core assembly body and a first electrode and a second electrode electrically connected with the electrode core assembly body; and for two electrode core assemblies connected in series, a position where the first electrode of one electrode core assembly and the second electrode of the other electrode core assembly are connected is located in the packaging film.

3. The battery according to claim 2, wherein a packaging portion is formed at a position on the packaging film corresponding to the first electrode and/or the second electrode, to isolate two adjacent electrode core assembly bodies; and
at least one of the first electrode of one of the two adjacent electrode core assemblies and the second electrode of the other of the two adjacent electrode core assemblies is arranged in the packaging portion.

4. The battery according to claim 1, wherein a plurality of packaging films are arranged; at least one of the electrode core assemblies is sealed in one of the packaging films; the electrode core assembly comprises a first electrode and a second electrode configured to lead out a current; and at least one of the first electrode and/or the second electrode extends out of the packaging film.

5. The battery according to claim 1, wherein the air pressure P1 between the metal shell and the packaging film ranges from −75 Kpa to −20 Kpa.

6. The battery according to claim 5, wherein the air pressure inside the packaging film is P2; P1 and P2 satisfy: P1>P2; and P1/P2 ranges from 0.05 to 0.85.

7. The battery according to claim 6, wherein a value of P2 ranges from −100 Kpa to −20 Kpa.

8. The battery according to claim 1, wherein a direction in which the electrode core assemblies are arranged is a first direction; a length of each of the electrode core assemblies extends along the first direction; a length of the battery extends along the first direction; and the length of the battery ranges from 400 mm to 2500 mm.

9. The battery according to claim 8, wherein a thickness of the battery extends along a second direction; the metal shell has two opposite first surfaces along the second direction; and at least one of the first surfaces is recessed into the metal shell.

10. The battery according to claim 9, wherein the two first surfaces are both recessed into the metal shell to hold the electrode core assemblies.

11. The battery according to claim 8, wherein the electrode core assembly comprises a first electrode and a second electrode configured to lead out a current; and the first electrode and the second electrode are respectively arranged on two sides of the electrode core assembly along the first direction.

12. The battery according to claim 8, wherein the battery is substantially a cuboid; and the thickness of the battery is larger than 10 mm.

13. The battery according to claim 12, wherein the thickness of the battery ranges from 13 mm to 75 mm.

14. The battery according to claim 1, wherein the packaging film comprises a non-metallic outer film layer and a non-metallic inner film layer that are stacked; the inner film layer is arranged between the electrode core assembly and the outer film layer; a melting point of the outer film layer is greater than a melting point of the inner film layer; and a difference between the melting point of the outer film layer and the melting point of the inner film layer ranges from 30° C. to 80° C.

15. The battery according to claim 14, wherein a material of the outer film layer is one or a combination of more than one of polyethylene terephthalate, polyamide, or polypropylene; and a material of the inner film layer is one or a combination of more than one of polypropylene, polyethylene, or polyethylene terephthalate.

16. The battery according to claim 15, wherein the outer film layer and the inner film layer are bonded.

17. The battery according to claim 16, wherein a binder for the bonding is a polyolefin binder.

18. The battery according to claim 1, wherein the packaging film is an aluminum-plastic film.

19. The battery according to claim 1, wherein the metal shell comprises a shell body with an opening and an end cover; the end cover is hermetically connected with the opening of the shell body to jointly define a hermetical accommodating chamber; the electrode core assemblies are arranged in the accommodating chamber; the electrode core assemblies are connected in series to form an electrode core string;
two ends of the electrode core string respectively comprise a first electrode and a second electrode; and the first electrode and the second electrode are respectively led out through the end cover.

20. The battery according to claim 19, wherein an exhaust hole is provided on the metal shell; and a sealing member is arranged in the exhaust hole.

21. The battery according to claim 1, wherein a thickness of the metal shell ranges from 0.05 mm to 1 mm.

22. A battery module, comprising the battery according to claim 1.

23. A battery pack, comprising a battery sequence, wherein the battery sequence comprises a plurality of batteries; each battery comprises a metal shell and a plurality of electrode core assemblies sealed in the metal shell and arranged in sequence; the electrode core assemblies are connected in series;
the battery further comprises a packaging film arranged in the metal shell; the electrode core assemblies are sealed in the packaging film; an air pressure between the metal shell and the packaging film is lower than an air pressure outside the metal shell; and an air pressure inside the packaging film is lower than the air pressure between the metal shell and the packaging film, wherein the air pressure between the metal shell and the packaging film is P1; and P1 ranges from −100 Kpa to −5 Kpa.

24. The battery pack according to claim 23, wherein a thickness of the battery extends along a second direction; the plurality of batteries are arranged in sequence along the second direction to form the battery sequence;
a gap is provided between at least two adjacent batteries; a ratio of the gap to the thickness of the battery ranges from 0.001 to 0.15.

25. The battery pack according to claim 24, wherein the metal shell comprises a shell body with an opening and an end cover; the end cover is hermetically connected with the opening of the shell body to jointly define a hermetical accommodating chamber; the electrode core assemblies are arranged in the accommodating chamber;
the gap between the two adjacent batteries comprises a first gap d1; the first gap is a minimum distance between two end covers of the two adjacent batteries along the second direction; the thickness of the battery is a dimension of the end cover along the second direction; and a ratio of the first gap d1 to the thickness of the battery ranges from 0.005 to 0.1.

26. The battery pack according to claim 24, wherein the metal shell comprises a shell body with an opening and an end cover; the end cover is hermetically connected with the opening of the shell body to jointly define a hermetical accommodating chamber; the electrode core assemblies are arranged in the accommodating chamber;
the metal shell has two opposite first surfaces along the second direction; the gap between the two adjacent batteries comprises a second gap d2; the second gap is a minimum distance between the two first surfaces of the two adjacent batteries facing each other; and the thickness of the battery is the dimension of the end cover along the second direction.

27. The battery pack according to claim 26, wherein the second gap d2 of the battery before use is larger than the second gap d2 after use.

28. The battery pack according to claim 24, further comprising a battery pack cover and a tray, wherein the battery pack cover is hermetically connected with the tray to form a battery accommodating cavity; the battery sequence is arranged in the battery accommodating cavity; the tray comprises a support member; a support region is formed on the metal shell; and the battery is butted with the support member by the support region and is supported on the support member.

29. The battery pack according to claim 28, wherein a length of the battery extends along a first direction; the first direction is perpendicular to the second direction; the tray comprises a side beam; the side beam is the support member; and two ends of the battery along the first direction are supported on the side beam.

30. An electric vehicle, comprising the battery pack according to claim 23.

* * * * *